United States Patent Office 2,971,013
Patented Feb. 7, 1961

2,971,013

POLYCHLOROBENZHYDRYL CRESOL

Charles E. Entemann, Painesville, Ohio, assignor to Diamond Alkali Company, Cleveland, Ohio, a corporation of Delaware No Drawing. Filed Mar. 13, 1957, Ser. No. 645,671

1 Claim. (Cl. 260—395)

This invention relates to novel polyhalobenzhydryl cresols and more specifically relates to polychlorobenzhydryl cresols.

This invention is particularly concerned with the preparation and application of hexachlorobenzhydryl orthocresol which has the following formula:

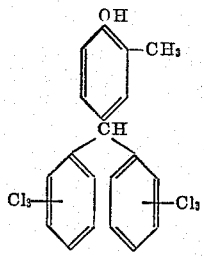

Compounds of this invention generally are useful as biologically active materials, for example, as phytotoxic substances. Such compounds generally may be prepared by reacting a polyhalobenzhydrol, e.g., a polychlorobenzhydrol, with a desired cresol, e.g., ortho, meta, or paracresol, or mixtures thereof. The reaction preferably is carried out as a molten phase reaction, e.g., by heating to melting a mixture of the polyhalobenzhydrol and cresol and continuing heating and agitation. In practice, it generally is advantageous to employ phosphoric acid, or its dehydration products such as polyphosphoric acid, to facilitate reaction typically by adding the acid to a molten mixture of the polyhalobenzhydrol and cresol.

In order that those skilled in the art may more completely understand the present invention and the preferred methods by which the same may be carried into effect, the following specific examples are offered:

*Example I*

There are melted together 23.4 gms. (0.06 mol) hexachlorobenzhydrol and 19.5 gms. (0.18 mol) o-cresol (freshly distilled). To this mixture is added 49.0 gms. (0.50 mol) phosphoric acid ($H_3PO_4$) and heating and agitation are continued for a total of 10½ hours at 100°–180° C. during which time an additional 21 gms. (0.25 mol) of phosphoric acid is added. The reaction mixture then is cooled below 50° C. and 50 ml. of water is added. The resultant mixture is then poured into cold water and allowed to stand. The organic layer is washed well with water and steam distilled. The residue following steam distillation, after cooling at room temperature, is filtered off, crushed to a coarse powder, washed free of acid and air dried. This material is then dissolved in 150 ml. of methanol and substantially decolorized by repeated heating with carbon and calcium carbonate until a pale of yellowish brown filtrate is obtained. The filtrate is diluted to about 200 ml. with methanol and stirred into about 1 liter of ice and water with about 150 ml. 1:1 hydrochloric acid. The resultant pale pink product is filtered off reslurried with water, again filtered, washed free of acid and air dried to yield a pale pink powder melting at 87°–89° C. The yield of purified product is 85% of theoretical. Chemical analysis of this product indicates preparation of the desired $C_{20}H_{12}Cl_6O$ and is as follows:

| Element | Percent Actual | Percent Theoretical |
|---|---|---|
| C | 49.8 | 49.9 |
| H | 2.75 | 2.685 |

*Example II*

To illustrate phytotoxicity of the product of Example I, cranberry bean plants are contacted with a 25% wettable powder formulation used as an aqueous mixture at a concentration of 1%. Severe plant damage is observed after 48 hours. An untreated plant exhibits no injury.

It will be understood, of course, that compounds of this invention may be formulated in various ways in preparing useful compositions. For example, it is contemplated that in many instances a suitable carrier can be employed which may be a liquid or solid and typically may comprise a substantially inert substance such as a finely-divided solid, e.g., clay diatomaceous earth, flour, silica, or the like. In other applications it may be desirable to employ a solvent, extender, diluent, conditioner or the like, including such liquids as water, as well as organic substances such as various petroleum distillate fractions, e.g., kerosene, as well as such liquids as xylene, toluene, alcohols, and the like. Accordingly, it will be understood that the term "carrier" as used in the specification and claim is intended to refer to such diluents, extenders, solvents, fillers, and the like, which generally comprise a major proportion of such compositions.

What is claimed is:

The compound having the structure

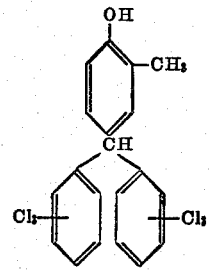

References Cited in the file of this patent

UNITED STATES PATENTS

| | | |
|---|---|---|
| 1,034,173 | Weiler | July 30, 1912 |
| 1,948,894 | Weiler | Feb. 27, 1934 |
| 1,971,436 | Weeler | Aug. 28, 1934 |
| 2,053,610 | Hermann | Sept. 8, 1936 |
| 2,053,853 | Van Peski | Sept. 8, 1936 |
| 2,148,758 | Lankelma | Feb. 28, 1939 |
| 2,184,491 | Foldi | Dec. 26, 1939 |
| 2,267,756 | Schussler | Dec. 30, 1941 |
| 2,281,624 | Schussler | May 5, 1942 |
| 2,459,525 | Hechenbleikner | Jan. 18, 1949 |
| 2,649,363 | Swezey | Aug. 18, 1953 |
| 2,706,678 | Denny | Apr. 19, 1955 |
| 2,766,263 | Hahn et al. | Oct. 9, 1956 |

FOREIGN PATENTS

| | | |
|---|---|---|
| 1,102,825 | France | Oct. 26, 1955 |

OTHER REFERENCES

Wagner et al.: Synthetic Organic Chemistry, 2nd ed. (1953), page 179 relied on.